United States Patent
Yokota et al.

(10) Patent No.: US 6,262,964 B1
(45) Date of Patent: Jul. 17, 2001

(54) DISC PLAYER WITH OBJECTIVE LENS ARRANGED IN A ZIGZAG PATTERN

(75) Inventors: Hiroshi Yokota; Ryuichi Naito; Hiroyuki Hirano; Katsumi Ishii; Shinichi Naohara; Yoshifumi Tsukada, all of Tokorozawa; Kanya Matsumoto, Tokyo-to, all of (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/328,133

(22) Filed: Jun. 8, 1999

Related U.S. Application Data (62) Division of application No. 09/150,596, filed on Sep. 10, 1998, now Pat. No. 5,953,308, which is a division of application No. 08/840,494, filed on Apr. 21, 1997, now Pat. No. 5,848,049, which is a division of application No. 08/541,621, filed on Oct. 10, 1995, now Pat. No. 5,677,904.

(30) Foreign Application Priority Data

Oct. 18, 1994 (JP) .............................................. P06-252547

(51) Int. Cl.⁷ .............................. G11B 7/08; G11B 21/02
(52) U.S. Cl. ............................................ 369/219; 369/244
(58) Field of Search ..................................... 369/215, 219, 369/244, 249; 360/121

(56) References Cited

U.S. PATENT DOCUMENTS

| | | | |
|---|---|---|---|
| 5,027,340 | * 6/1991 | Yumura et al. | 369/219 |
| 5,600,623 | * 2/1997 | Miyazaki et al. | 369/219 |
| 5,719,848 | * 2/1998 | Ikegame | 369/219 |

FOREIGN PATENT DOCUMENTS

| | | | |
|---|---|---|---|
| 54-114220 | * 9/1979 | (JP) . | |
| 63-214935 | * 9/1988 | (JP) | 369/244 |
| 1-118246 | * 5/1989 | (JP) . | |
| 1-151074 | * 6/1989 | (JP) | 369/215 |
| 1-182979 | * 7/1989 | (JP) | 369/215 |
| 3-203031 | * 9/1991 | (JP) | 369/244 |
| 5-47000 | * 2/1993 | (JP) . | |
| 6-60389 | * 3/1994 | (JP) | 369/244 |

\* cited by examiner

*Primary Examiner*—David L. Ometz
(74) *Attorney, Agent, or Firm*—Pitney, Hardin, Kipp & Szuch LLP (57) ABSTRACT

A disc player has a first array of pickup devices arranged in a line for reading information from a disc and a second array of pickup devices arranged in a parallel line. The pickup devices are each independently movable along their respective lines with the devices of the first line offset from the devices of the second line so as to form a zigzag pattern.

9 Claims, 5 Drawing Sheets

DISC PLAYER WITH OBJECTIVE LENS ARRANGED IN A ZIGZAG PATTERN

CROSS REFERENCE TO OTHER APPLICATIONS

The present application is a divisional of application 09/150,596 filed Sep. 10, 1998 and now U.S. Pat. No. 5,953,308 which is a division of application 08/840,494 filed Apr. 21, 1997 and now U.S. Pat. No. 5,848,049 which is a division of application Ser. No. 08/541,621 filed Oct. 10, 1995 and now U.S. Pat. No. 5,677,904.

BACKGROUND OF THE INVENTION

1. Field of the Invention

This invention relates to a system for a video program service, so-called Video On Demand (VOD) system, which supplies video programs utilizing a CATV system or the like in response to user's requests, and more particularly to a technique for obtaining plural reproduction signals of the same video program simultaneously from a unique video disc.

2. Description of the Prior Art

There is known a disc reproduction device having an ability to reproduce video signals from a unique video disc at different times (hereinafter referred to as "VOD reproduction"). The device of this type is equipped with a plurality of pickups for reading information and guide bars for supporting the pickups around a rotary axis of the disc. The device can reproduce a plurality of video signals simultaneously from a unique disc with a single disc rotation mechanism. It is preferable in the VOD reproduction that the video programs periodically start with approximately same time intervals between them. The interval of the program starting times is put the following limit:

Limit of time interval=(total reproduction time of the program)/(the number of the pickup device). Since the user generally wishes to watch the video program from the start, he or she needs to wait for the start of the next program. Shortening the time interval of the programs contributes to the reduction of the user's waiting time. In this view, in order to reduce the user's waiting time, it is required to equip the VOD reproduction device with as many pickup devices as possible. For example, where a video program requiring two hour reproduction time is reproduced using four pickup devices, the time interval of the starting time is a half hour (two hours/4 pickups). Namely, the same program is reproduced four times with delay times of a half hour between them.

However, in the above described VOD reproduction device, the physical shape and the structure of the pickup device put the limitation on the number of pickup device to be equipped, and therefore it is difficult to reduce the time interval of the programs beyond a certain extent. Specifically, the known reproduction device is provided with the guiding mechanism of the pickup (e.g., guide bar) on both sides of the pickup to ensure the smooth transfer of the pickup in the radial direction of the disc. Therefore, if the guide bars are arranged closely to each other so as to increase the number of the pickup device, they contact and interfere with each other in the proximity of the rotary axis of the disc due to their structural features (this phenomenon is hereinafter referred to as "interference").

SUMMARY OF THE INVENTION

It is an object of the present invention to provide a disc player capable of reducing the program waiting time of the user in VOD reproduction.

According to one aspect of the present invention, there is provided a disc player including: a plurality of pickup devices for reading information from a disc; and a plurality of guide devices having a longitudinal axis for transferring the pickup device, the longitudinal axis being directed in a direction rotated by a predetermined angle with respect to a radial direction of the disc.

According to another aspect of the present invention, there is provided a disc player including at least one pickup device, the pickup device including: a first pickup device movable substantially in a radial direction of a disc for reading information from the disc; and a second pickup device movable substantially in the radial direction of the disc for reading information from the disc, the first pickup device and the second pickup device being movable independently of and in parallel with each other.

According to still another aspect of the present invention, there is provided a disc player including: a plurality of pickup devices for reading information from the disc; and a plurality of guide devices arranged radiately from a center of the disc for transferring the pickup device in a radial direction of the disc, the plurality of guide devices including: first guide devices for raising the pickup device at an inner circumferential portion of the disc; and second guide devices for bringing the pickup device down at the inner circumferential portion of the disc, the first guide devices and the second guide devices being arranged alternately in a circumferential direction of the disc.

According to still another aspect of the present invention, there is provided a disc player including: first pickup devices arranged in alignment with each other in a radial direction of a disc for reading information from the disc; second pickup devices arranged in alignment with each other in the radial direction of the disc for reading information from the disc; and device for moving the first pickup devices and the second pickup devices in the radial direction of the disc, the first pickup devices being arranged in parallel with the second pickup devices.

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENT

Preferred embodiments of the present invention will be described below with reference to the accompanying drawings.

1st Embodiment

Figure 1A:
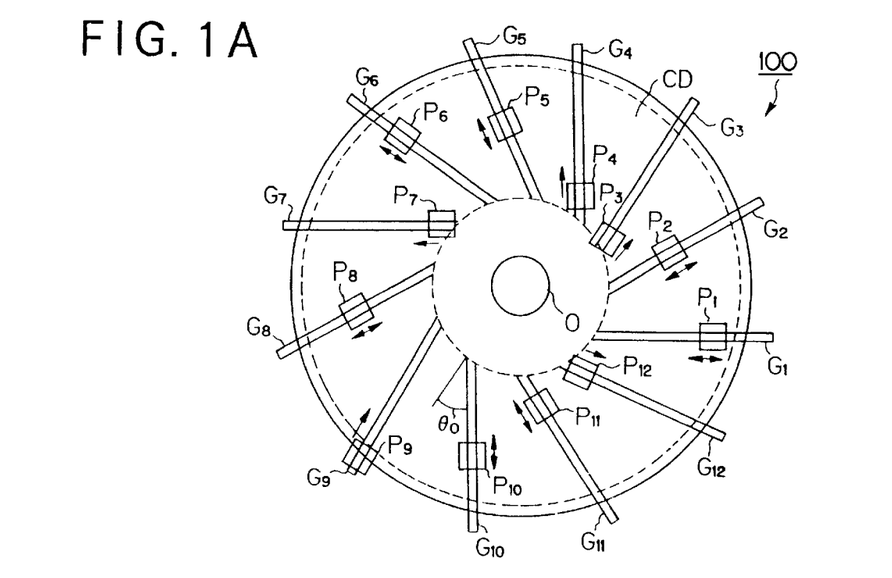
FIG. 1A is a plan view illustrating arrangement of the guide bars of the disc player according to the first embodiment.

FIG. 1A schematically illustrates the positioning of the guide bars in the disc player 100 of the first embodiment. As shown, the disc player 100 is so constructed that, when the disc 100 is set, plural guide bars $G_1$–$G_{12}$ are positioned with a predetermined angle $\theta_0$ with respect to the radial direction of the disc, respectively. With each of the guide bars, a pickup device is provided in a slidable fashion along the guide bar in the longitudinal direction thereof. In this embodiment, the pickup device is of three-beams type which produces a main beam for tracing the target track and two sub-beams for tracing the neighboring tracks. It is noted however that pickup devices of one-beam type may be alternatively used. As has been mentioned, where the guide bars are arranged in the radial direction of the disc, the pickup devices probably interfere with each other due to their physical structures when tracing the inner circumferential portion of the disc simultaneously. However, according to the arrangement shown in FIG. 1A, the pickup devices do not physically and structurally interfere with each other in the vicinity of the rotary axis even when most of them trace the inner circumferential portion of the disc at the same time. Therefore, more pickup devices and guide bars may be equipped on the disc player.

Figure 1B:
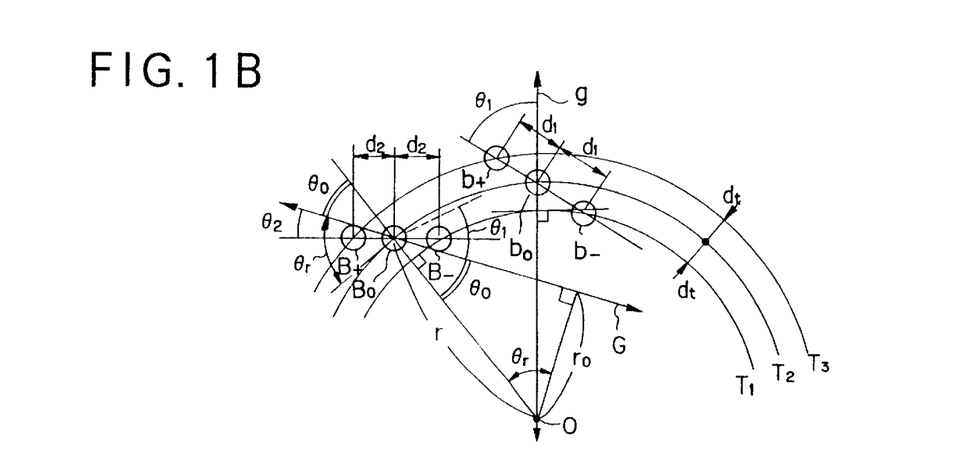
FIG. 1B is an explanatory diagram illustrating how the angle of the guide bar shown in FIG. 1A is determined.

In the case where the pickup device moves along the guide bar in the direction of the angle $\theta_0$ rotated with respect to the radial direction of the disc, the sub-beams of the three spot type pickup device fail to correctly trace the neighboring tracks. This will be explained by referring to FIG. 1B. FIG. 1B schematically shows the positions of the three light spots tracing the tracks $T_1$–$T_3$. When the guide bar is arranged in the radial direction of the disc, like the guide bar g, the three light spots $b_0$, $b_+$ and $b_-$ are positioned as illustrated in FIG. 1B. Namely, when the main beam $b_0$ is tracing the center track $T_2$, the sub-beams $b_+$ and $b_-$ trace correctly the neighboring tracks $T_1$ and $T_3$, respectively. Here, the angle produced by the direction in which the three beams are aligned and the direction of the guide bar is $\theta_1$. Namely, according to the normal arrangement of the pickup device, the alignment direction of the three beams and the direction of the guide bar produces a predetermined angle ($\theta_1$ in this case). On the other hand, when the guide bar direction is rotated like the arrangement of the first embodiment, the three beams of the pickup device align in the direction of the broken line in FIG. 1B. The broken line indicates the alignment direction of the three beams when the pickup device is positioned on the guide bar so that the alignment direction of the beams and the guide bar direction maintain the angle $\theta_1$. Namely, the sub-beams are produced off the neighboring tracks $T_1$ and $T_3$ because the alignment direction of the three beams has the angle $\theta_1$ with respect to the guide bar direction. As seen from FIG. 1B, the sub-beams cannot trace the neighboring tracks accurately if the first embodiment is simply applied to the disc player of the three beams type pickup device. For this reason, in this embodiment, the alignment direction of the three beams is corrected so that the angle of the tangential direction of the disc and the direction of the guide bar, which varies according to the distance from the disc center, is compensated for, or alternatively the pitch between the main beam and the sub-beams are adjusted, thereby correctly positioning the three spots $B_0$, $B_+$ and $B_-$ on the tracks $T_1$–$T_3$.

Next, the manner of the above correction will be described. Where the guide bar is inclined with respect to the radial direction of the disc, the angle produced by the direction of the guide bar and the tangential direction of the concentric circle of the disc gradually varies dependently upon the distance from the disc center, and thereby the tracking control of the sub-beams is made unstable. Now, in FIG. 1B, the track pitch of the disc DC is represented by $d_t$, the angle produced by the direction of the guide bar G and the tangential direction of the disc is represented by $\theta_r$, the angle produced by the direction of the guide bar G and the alignment direction of the three beams is represented by $\theta_2$, the pitch between the main beam and the sub beams where the guide bar is in the radial direction of the disc is represented by $d_1$, and the pitch between the main beam and the sub-beams according to this embodiment is represented by $d_2$. In this case, the following equation stands:

$$d_2 \cdot \cos(\theta_0 + \theta_2) = d_1 \cdot \cos\theta_1 = d_t \tag{1}$$

When the guide bar is directed in the radial direction, since the angle $\theta_1$ produced by the direction of the guide bar g and the alignment direction of the beams is constant, the pitch $d_1$ between the main beam and the sub beams is constant. On the other hand, according to this embodiment, the pitch $d_2$ and the angle $\theta_2$ vary dependently upon the distance of the main beam from the disc center. Now, assuming that the radius of the track $T_2$ from the disc center O is r where the guide bar G having the inclination $\theta_0$ with respect to the disc radial direction passes the point remote from the disc center O by the distance $r_0$, the following equation stands:

$$r \sin\theta_r = r \sin(\pi/2 - \theta_0) = r \cos\theta_0 = r_0 \tag{2}$$

Therefore, from the equations (1) and (2), the following relationship is obtained:

$$\theta_2 = \cos^{-1}(d_t/d_2) - \theta_0 \tag{3}$$
$$= \cos^{-1}(d_t/d_2) - \cos^{-1}(r_0/r)$$

In the equation (3), the first term is a constant, and $r_0$ is a fixed value. Accordingly, if the position of the main beam is detected and the distance r from the disc center is given, the angle $\theta_2$ may be obtained. Then, by controlling the pickup device so that the angle between the alignment direction of the beams and the direction of the guide bar maintains the angle $\theta_2$ thus obtained, the sub-beams trace the tracks $T_1$ and $T_3$ stably and correctly.

Reversely, in the case where the angle $\theta_2$ between the guide bar direction and the beam alignment direction is kept constant, the pitch $d_2$ between the main beam and the sub-beams is calculated by the following equation:

$$d_2 = d_t/(\cos(\theta_0 + \theta_2)) \tag{4}$$
$$= d_t/(\cos(\cos^{-1}(r_0/r) + \theta_2)),$$

and the pitch between the sub-beams may be controlled. Consequently, in order to correctly position the sub-beams on the neighboring tracks, the pickup device is so controlled as to rotate the alignment direction of the three beams according to the equation (3), or alternative means for adjusting the pitch of the beams is provided.

According to the equations (3) and (4), the value $\theta_2$ or $d_2$ is obtained when the address of the track where the main beam is tracing is detected. Therefore, a function table may be prepared and stored in a ROM, and the controller of the disc player reads the table to rotate the beam alignment direction or to adjust the pitch of the beams. Alternatively, if a cam mechanism is provided on the guide bar so that the beam alignment direction of the pickup device automatically rotates according to the movement of the pickup along the guide bar, the control may be simplified.

As described above, according to the first embodiment, since the guide bar is inclined with respect to the radial direction of the disc, the interference between the pickup devices in the vicinity of the disc center may be avoided even when the number of the pickup is increased. As a result, an identical video program on a disc may be reproduced by the plural pickup devices with a short delay time and hence the waiting time of the user may be reduced in the VOD reproduction. Further, even in use of the three-beams type pickup, the alignment direction or the pitch of the beams may be appropriately controlled based on the above-mentioned equations when the distance of the light beam from the disc center is detected, thereby the accurate-tracking control may be ensured.

2nd Embodiment

Figure 2:
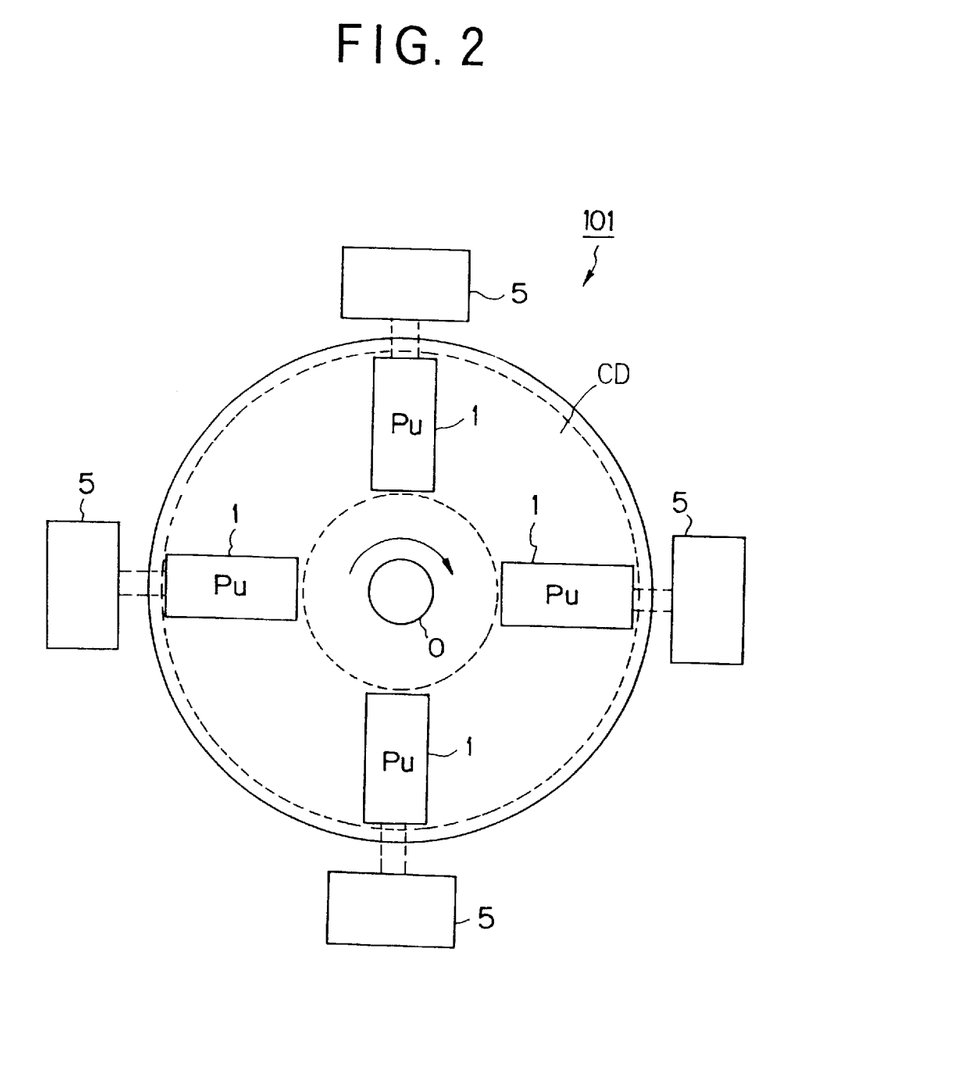
FIG. 2 is a plan view roughly illustrating the structure of the disc player according to the second embodiment.
Figure 3A:
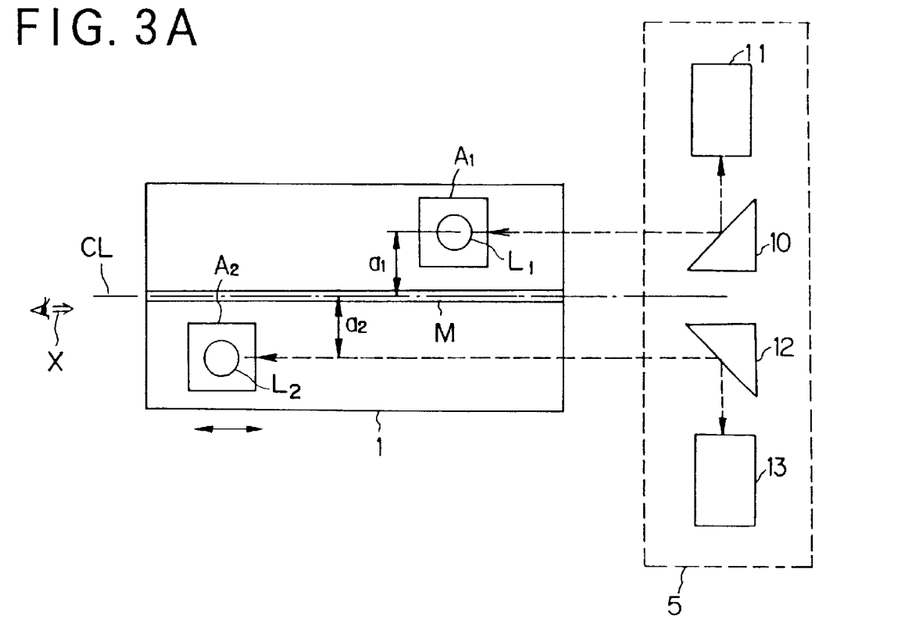
FIG. 3A is a block diagram illustrating the structure of the pickup shown in FIG. 2.
Figure 3B:
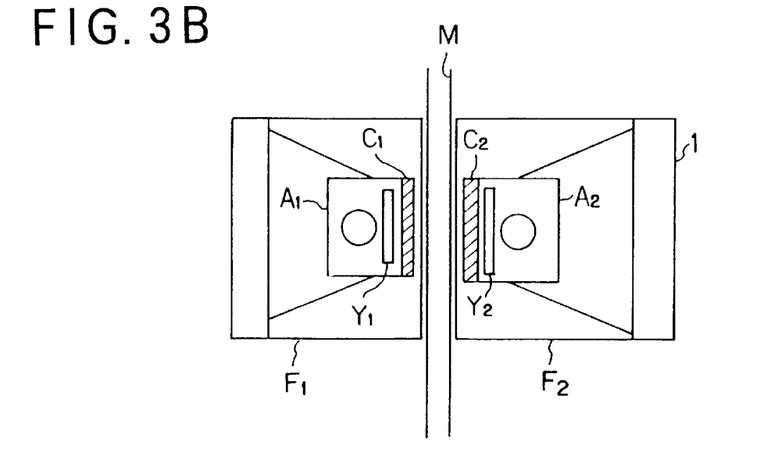
FIG. 3B is a cross-sectional view of the pickups shown in FIG. 3A observed from the rotary axis of the disc.

Next, the second embodiment of the present invention will be described. FIG. 2 illustrates the structure of the disc player according to the second embodiment. As illustrated, the disc player 101 according to the second embodiment includes pickup devices 1 for reading information from the disc CD and processing units 5 for processing the read-out light beams from the pickup devices 1 to convert them into electrical reproduction signals. FIGS. 3A and 3B illustrate the details of the pickup device 1. FIG. 3A is a plan view observed from the upside of the disc CD, and FIG. 3B is a view observed from the direction X shown in FIG. 3A. As shown, the pickup device 1 includes a magnet M arranged in a manner that the longitudinal axis is directed in the radial direction of the disc, and actuators $A_1$ and $A_2$ for carrying out the tracking servo control and the focusing servo control. Each of the actuators $A_1$ and $A_2$ includes an object lens $L_1$ and $L_2$ for reading information from the disc. The actuators $A_1$ and $A_2$ are positioned on the opposite sides of the center line CL, which passes the disc center and extends in the radial direction of the disc, and remotely from the center line CL by the pitches $a_1$ and $a_2$, respectively. The processing unit 5 includes a mirror 10 for changing the direction of the light beam from an optical system 11 and the read-out light beam from the actuator $A_1$ in the direction perpendicular to the optical path thereof, a mirror 12 for changing the direction of the light beam from an optical system 13 and the read-out light beam from the actuator $A_2$ in the direction perpendicular to the optical path thereof, and the optical systems 11 and 13 include a photo-detecting element. FIG. 3B is a view from the central axis of the disc CD (direction X in FIG. 3A). As shown in FIG. 3B, the actuator $A_1$ includes an objective lens $L_1$, a frame $F_1$, a yoke $Y_1$ housed in the frame $F_1$ for producing a magnetic field, and a coil $C_1$ coupled to the objective lens $L_1$ for the tracking servo and focusing servo. Similarly, the actuator $A_2$ includes an objective lens $L_2$, a frame $F_2$, a yoke $Y_2$ and a coil $C_2$. Between the frames $F_1$ and $F_2$, the magnet M having a longitudinal axis directed in the radial direction of the disc is interposed.

Next, the operation will be described. The disc player 101 drives the actuators $A_1$ and $A_2$ independently of each other. The optical system emits a light beam and the mirror 10 reflects the light beam to the direction of the actuator $A_1$. The lens $L_1$ of the actuator $A_1$ receives the light beam and focuses it on the target track of the disc. The read-out light beam from the actuator $A_1$ is directed and supplied to the processing system 11 by the function of the mirror 10. In the similar manner, the light beam from the optical system 13 is irradiated on the disc and the read-out light beam from the actuator $A_2$ is directed and supplied to the processing system 13 by the function of the mirror 12. Normally, an actuator includes a coil interposed between two magnets, and the servo control is performed by flowing a current in the coil, i.e., utilizing the magnetic field produced by the two magnets, thereby moving the object lens for the focus servo control. In this embodiment, the magnet M is used by the actuators $A_1$ and $A_2$ in common. Namely, the current flows through the coil $C_1$ within the magnetic field produced by the yoke $Y_1$ and the magnet M, thereby performing servo control of the actuator $A_1$. Similarly, the servo control of the actuator $A_2$ is performed by flowing the current through the coil $C_2$ within the magnetic field produced by the yoke $Y_2$ and the magnet M.

In this embodiment, two actuators $A_1$ and $A_2$ are arranged in a single pickup device, and the actuators $A_1$ and $A_2$ are positioned remotely from the center line CL by the pitches $a_1$ and $a_2$, respectively. However, if the transfer direction of the pickup deviates from the center line CL too much, the positions and angles of the main beam and the sub-beams should be adjusted, as described in the first embodiment. Therefore, it is preferable that the pitches $a_1$ and $a_2$ are as small as possible. In this regard, if the pitches $a_1$ and $a_2$ cannot be reduced, the positions and angles of the beams may be adjusted in the same manner as described in the first embodiment.

As described above, according to the second embodiment, since two actuators are arranged in a single pickup device, eight programs can be simultaneously reproduced using four guide bars, thereby doubling the number of reproduced programs and halving the waiting time.

3rd Embodiment

Figure 4:
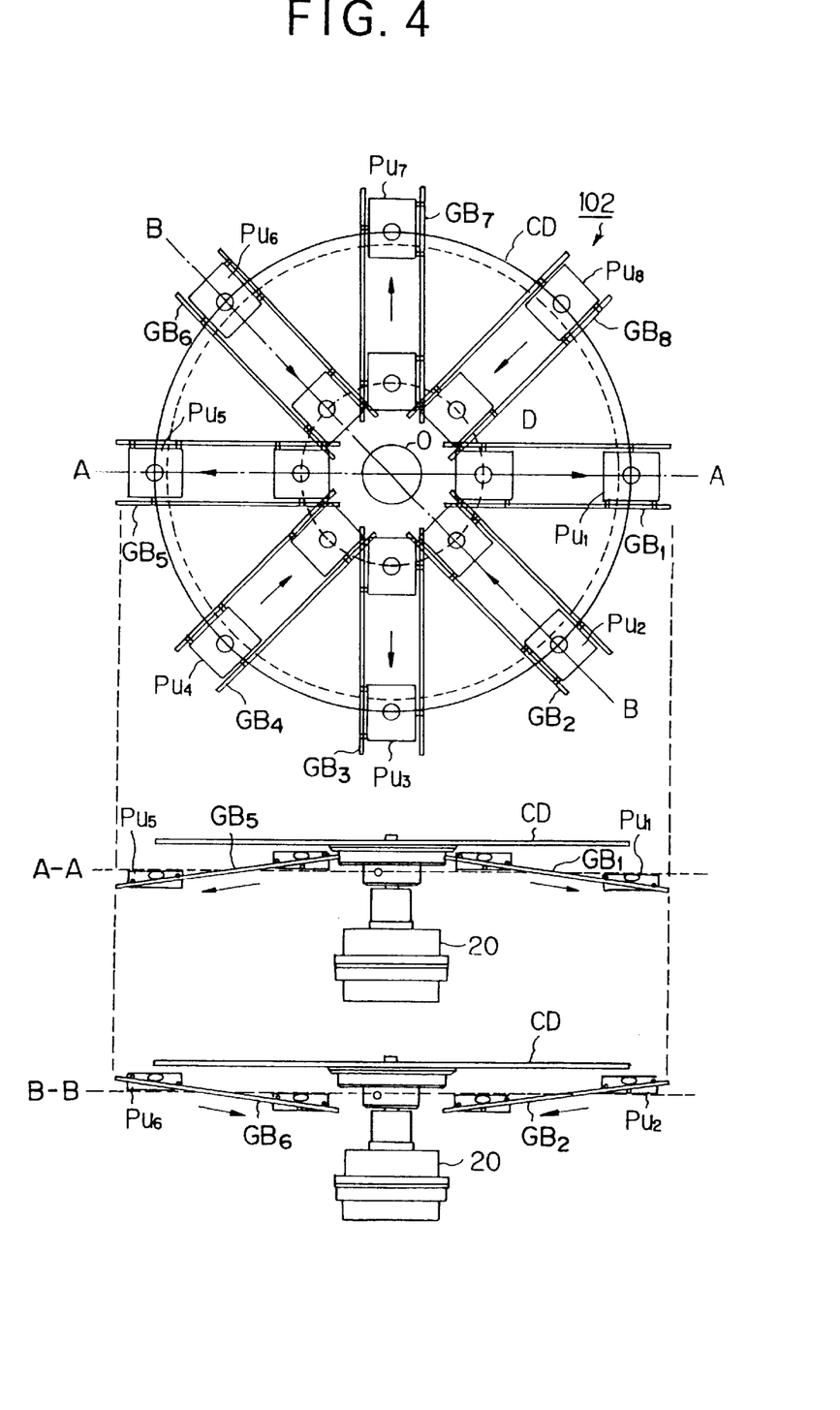
FIG. 4 is a view illustrating the structure of the disc player according to the third embodiment.

FIG. 4 illustrates a structure of the disc player according to the third embodiment. In FIG. 4, the positional relationship of the guide bars and the disc is depicted. The disc player 102 includes guide bars $GB_1$–$GB_8$ arranged radiately from the disc center O, pickup devices $Pu_1$–$Pu_8$ slidable on the guide bars $GB_1$–$GB_8$, respectively, and a motor 20 for rotating the disc CD. The figure at the top of FIG. 4 is a plan view of the disc player viewed from the upside thereof, the figure at the middle of FIG. 4 is a cross-sectional view of the disc player sliced at the line A—A, and the figure at the bottom of FIG. 4 is a cross-sectional view of the disc player sliced at the line B—B. As shown in FIG. 4, around the disc center, guide bars having different slopes (i.e., inclination) in contrary direction are provided alternately. The guide bars $GB_1$, $GB_3$, $GB_5$ and $GB_7$ are so constructed as to gradually descends as it approaches the circumferential edge of the disc. Namely, as the pickup devices $Pu_1$, $Pu_3$, $Pu_5$ and $Pu_7$ get far from the disc center, the height of them get lower and they descends away from the disc. On the other hand, guide bars $GB_2$, $GB_4$, $GB_6$ and $GB_8$ are so constructed as to gradually ascends as it approaches the circumferential edge of the disc. Namely, as the pickup device $Pu_2$, $Pu_4$, $Pu_6$ and $Pu_8$ move away from the disc center, the height of them get higher and they get closer to the disc. The area D in FIG. 4 is an area where the pickup devices would physically interfere with each other if eight guide bars are simply provided without the sloped or inclined manner arrangement. However, in this embodiment, since the positions in height of the pickup devices change according to the slopes of the guide bars, the pickup devices or the edge portions of the guide bars are free from the interference with each other. Therefore, more guide bars and the pickup devices may be equipped.

In operation, the pickup devices $Pu_1$–$Pu_8$ are subjected to the height servo control which raises or lowers the pickup device as a whole where the focus control cannot be completed only by the follow-up operation of the object lens by means of the actuator. The height servo has been irregularly used to compensate for the focus servo control where the actual disc curvature is beyond the predicted degree. In this embodiment, the height servo control is regularly used. For the height servo control, the focus error signal may be used like the manner of the focusing servo control. Specifically, at the beginning of the reproduction, the odd-numbered pickup devices $Pu_1$, $Pu_3$, $Pu_5$ and $Pu_7$ are controlled only by the focus servo control without the height servo control near the disc center O. As the pickup device moves toward the disc circumference, the pickup device gradually descends and gets remoter from the disc. When the distance between the pickup device and the disc goes beyond the followable range of the focus servo, the height servo is started to ascend the pickup device upwardly. In this manner, the focus control is stably performed around the edge portion of the disc. On the other hand, the even-numbered pickup devices $Pu_2$, $Pu_4$, $Pu_6$ and $Pu_8$ are controlled in the manner reverse to the above control. Namely, at the beginning of the reproduction, the height servo is performed to ascend the pickup upwardly. When the distance between the pickup device and the disc falls within the followable range of the focus servo, the height servo is terminated and only the focus servo is performed. In this manner, the focus control is stably performed around the edge portion of the disc.

As described above, according to the disc player of the third embodiment, more pickup devices can be employed freely from the structural interferences by providing the guide bars in the sloped manner, thereby reducing the waiting time of the user in the VOD reproduction.

4th Embodiment

Figure 5:
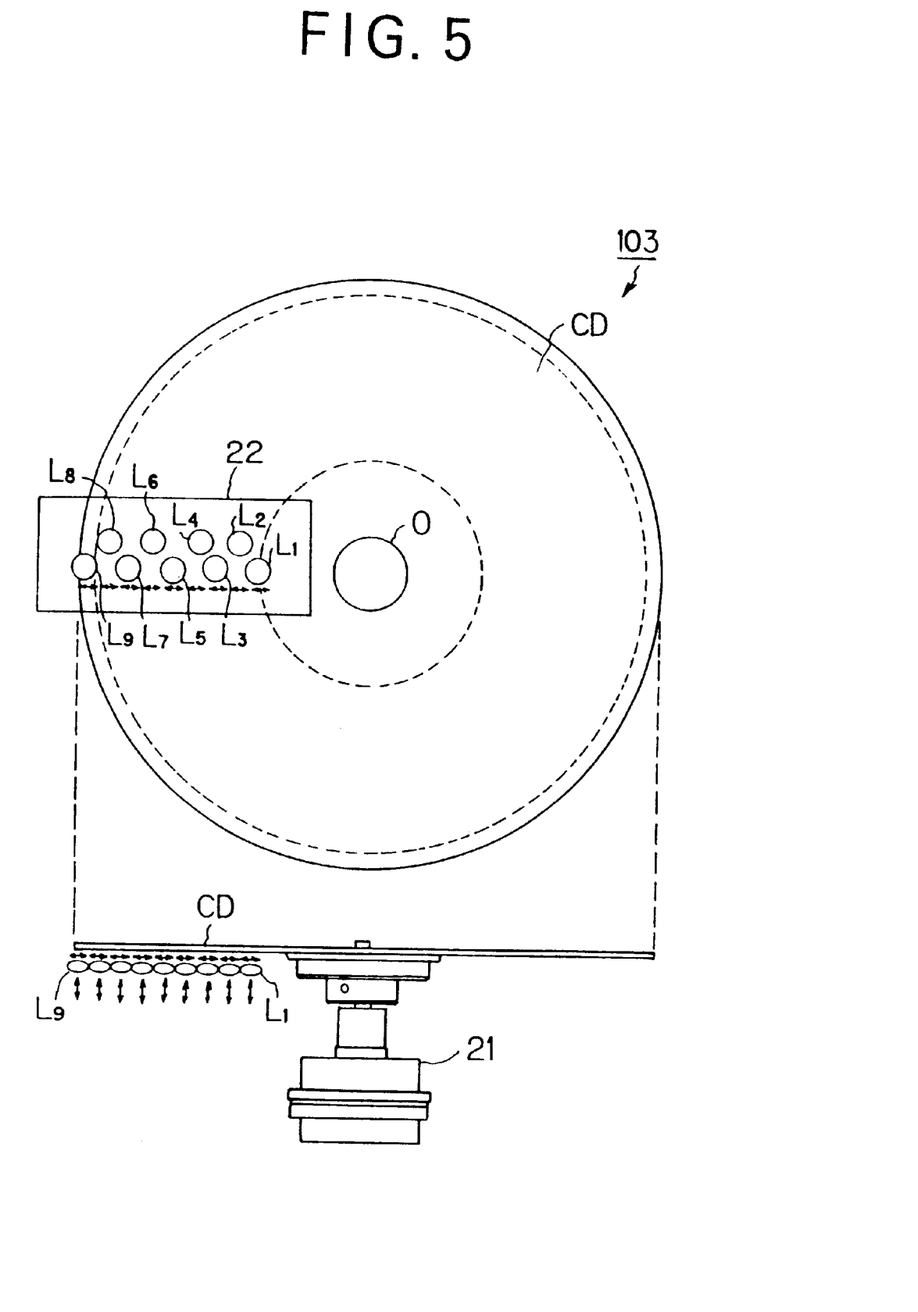
FIG. 5 is a view illustrating the structure of the disc player according to the fourth embodiment.

FIG. 5 illustrates the positional relationship of the disc and the lenses of the disc player according to the fourth embodiment. In FIG. 5, only the lenses are illustrated for the sake of simplicity. As illustrated, the disc player 103 is provided with a plurality of actuators aligned in the radial direction of the disc. The actuators of the objective lenses are moved in the radial direction of the disc CD by the supporting device 22 which movably supports the actuators of the lenses $L_1$–$L_9$, so that the reproduction area of the neighboring actuators overlap with each other in the radial direction of the disc. Since the actuators are arranged in the zigzag manner in the radial direction, the neighboring two actuators, e.g., $L_1$ and $L_2$, can reproduce an identical track simultaneously. The motor 21 rotates the disc CD. The maximum number of the pickup devices to be provided is limited by the radius of the disc and the effective width of the pickup device. The optical systems for processing the read-out light beams of the odd-numbered pickup devices $Pu_1$, $Pu_3$, $Pu_5$ and $Pu_7$ and the even-numbered pickup devices $Pu_2$, $Pu_4$, $Pu_6$ and $Pu_8$ are positioned alternately on different sides of the radial direction of the disc, thereby avoiding the structural interference between the pickup devices and reducing the pitch between the neighboring pickup devices.

Next, the operation of the disc player 103 will be described. First, the motor 21 drives the disc CD, and the disc player starts reproduction of the first program on the disc CD. The pickup device $L_1$ reads the lead-in area, and then reads out information from the first track. As the track being reproduced moves in the outer direction of the disc, the pickup device $L_1$ moves to outer area in the radial direction of the disc. When the pickup device $L_1$ enters the area where both the pickup devices $L_1$ and $L_2$ can reproduce information, the pickup device $L_2$ starts reproduction of the track which the pickup device $L_1$ is reading. Then, the synchronization of the reproduction signals obtained by the two pickup devices $L_1$ and $L_2$ is checked, and when the synchronization is confirmed, the servo control of the pickup device $L_1$ is released. In this way, the reproduction of the program is taken over from the pickup device $L_1$ to the pickup deice $L_2$. Similarly, the reproduction of the program is taken over from the pickup device $L_2$ to $L_3$, from $L_3$ to $L_4$, for eight times in the same manner until the pickup device $L_9$ complete the reproduction of the program at the outermost portion of the disc. The pickup device which has given the reproduction role to the next pickup and whose servo control is released can newly start reproduction of the program immediately, and hence nine reproductions can be continued with predetermined delay times using the nine pickup devices simultaneously.

As described above, according to the disc player of the fourth embodiment, since the plural pickup devices are provided in alignment in the radial direction of the disc, the VOD reproduction can be achieved without the provision of the driving mechanism for each of the pickup device independently.

What is claimed is:

1. A disc player comprising:
   a first array of pickup devices arranged to form a first line and for reading information from a disc, each of the pickup devices of the first array being movable in the direction of the first line independently of each other and
   a second array of pickup devices arranged to form a second line and for reading information from the disc, each of the pickup devices of the second array being movable in the direction of the second line independently of each other, the second array being arranged in parallel with the first array.

2. A disc player according to claim 1, wherein each of the pickup devices comprises a lens, the first array and the second array being arranged such that centers of the lenses of the first array are positioned between centers of the lenses of the second array.

3. A disc player according to claim 1, wherein the pickup devices of the first array and the second array are arranged in a zigzag fashion.

4. A disc player according to claim 1, wherein a movable range of each of the pickup devices in the first array overlaps with a movable range of each of the pickup devices in the second array.

5. A disc player comprising:
   a common supporting device having an elongated body;
   a first array of pickup devices arranged on the supporting device in line in the direction of the elongated body and for reading information from a disc, each of the first array of pickup devices being movable in the direction of the elongated body independently of each other; and
   a second array of pickup devices arranged on the supporting device in line in the direction of the elongated body and for reading information from the disc, each of said second array of pickup devices being movable in the direction of the elongated body independently of each other, the first array being arranged in parallel with the second array.

6. A disc player according to claim 5, wherein each of the pickup devices comprises a lens, the first array and the second array being arranged such that centers of the lenses of the first array are positioned between centers of the lenses of the second array in the direction of the elongated body.

7. A disc player according to claim 5, wherein the pickup devices of the first array and the second array are arranged in a zigzag fashion in the direction of the elongated body.

8. A disc player according to claim 5, wherein a movable range of each of the pickup devices in the first array overlaps with a movable range of each of the pickup devices in the second array.

9. A disc player comprising:

a supporting device;

an array of pickup devices arranged on the supporting device to form a single line which corresponds to a single radius of a disc from its center to its circumferential edge and for reading information from the disc, each of the pickup devices being movable in the direction of the single line independently of each other, a movable range of each pickup device overlapping with the movable range of the neighboring pickup devices; and a controller for successively switching to a selected one of the pickup devices to continuously reproduce single information.

* * * * *